US011550054B2

(12) United States Patent
Alexandrov et al.

(10) Patent No.: US 11,550,054 B2
(45) Date of Patent: Jan. 10, 2023

(54) OPTICAL TRIANGULATION SENSOR FOR DISTANCE MEASUREMENT

(71) Applicant: RobArt GmbH, Linz (AT)

(72) Inventors: Vladimir Alexandrov, Linz (AT); Harold Artés, Linz (AT); Christoph Freudenthaler, Linz (AT); Michael Schahpar, Linz (AT)

(73) Assignee: RobArtGmbH, Linz (AT)

( * ) Notice: Subject to any disclaimer, the term of this patent is extended or adjusted under 35 U.S.C. 154(b) by 450 days.

(21) Appl. No.: 15/737,510

(22) PCT Filed: Jun. 6, 2016

(86) PCT No.: PCT/AT2016/050179
§ 371 (c)(1),
(2) Date: Dec. 18, 2017

(87) PCT Pub. No.: WO2016/201465
PCT Pub. Date: Dec. 22, 2016

(65) Prior Publication Data
US 2018/0180738 A1    Jun. 28, 2018

(30) Foreign Application Priority Data

Jun. 18, 2015 (DE) .................. 102015109775.3

(51) Int. Cl.
*G01S 17/48*    (2006.01)
*G01S 7/481*    (2006.01)
(Continued)

(52) U.S. Cl.
CPC ............ *G01S 17/48* (2013.01); *G01S 7/4813* (2013.01); *G01S 17/931* (2020.01); *B25J 9/1676* (2013.01); *Y10S 901/01* (2013.01); *Y10S 901/47* (2013.01)

(58) Field of Classification Search
CPC ...... G01S 17/48; G01S 17/931; G01S 7/4813; B25J 9/1676; Y10S 901/01; Y10S 901/47
See application file for complete search history.

(56) References Cited

U.S. PATENT DOCUMENTS 4,674,048 A     6/1987  Okumura
4,740,676 A *   4/1988  Satoh ................. G02B 7/32
                                              250/201.4
(Continued)

FOREIGN PATENT DOCUMENTS

AU     2015322263     4/2017
CA     2322419        9/1999
(Continued)

OTHER PUBLICATIONS

Choset et al., "Principles of Robot Motion", Theory, Algorithms, and Implementations, Chapter 6—Cell Decompositions, 2004, document of 41 pages.
Durrant-Whyte et al., "Simultaneous Localization and Mapping (SLAM): Part I The Essential Algorithms", in: IEEE Robotics and Automation Magazine, vol. 13, No. 2, pp. 99-108, Jun. 2006.
(Continued)

*Primary Examiner* — Hovhannes Baghdasaryan
(74) *Attorney, Agent, or Firm* — Akerman LLP; Peter A. Chiabotti

(57) ABSTRACT

An optical triangulation sensor for distance measurement is described herein. In accordance with one embodiment, the apparatus comprises a light source for the generation of structured light, an optical reception device, at least one attachment element and a carrier with a first groove on a lateral surface of the carrier, wherein the light source and/or optical reception device is at least partially arranged in the first groove and is held in place on the carrier by the attachment element.

24 Claims, 4 Drawing Sheets

(51) Int. Cl.
    *G01S 17/931*    (2020.01)
    *B25J 9/16*    (2006.01)

(56) References Cited

U.S. PATENT DOCUMENTS

| | | | |
|---|---|---|---|
| 4,777,416 A | 10/1988 | George, II et al. | |
| 5,109,566 A | 5/1992 | Kobayashi et al. | |
| 5,260,710 A * | 11/1993 | Omamyuda | G01S 7/4811 342/70 |
| 5,284,522 A | 2/1994 | Kobayashi et al. | |
| 5,377,106 A | 12/1994 | Drunk et al. | |
| 5,402,051 A | 3/1995 | Fujiwara et al. | |
| 5,696,675 A | 12/1997 | Nakamura et al. | |
| 5,787,545 A | 8/1998 | Colens | |
| 5,995,884 A | 11/1999 | Allen et al. | |
| 6,366,219 B1 | 4/2002 | Hoummady | |
| 6,389,329 B1 | 5/2002 | Colens | |
| 6,532,404 B2 | 3/2003 | Colens | |
| 6,594,844 B2 | 7/2003 | Jones | |
| 6,605,156 B1 | 8/2003 | Clark et al. | |
| 6,615,108 B1 | 9/2003 | Peless et al. | |
| 6,667,592 B2 | 12/2003 | Jacobs et al. | |
| 6,690,134 B1 | 2/2004 | Jones et al. | |
| 6,764,373 B1 | 7/2004 | Osawa et al. | |
| 6,781,338 B2 | 8/2004 | Jones et al. | |
| 6,809,490 B2 | 10/2004 | Jones et al. | |
| 6,965,209 B2 | 11/2005 | Jones et al. | |
| 6,972,834 B1 | 12/2005 | Oka et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,302,345 B2 | 11/2007 | Kwon et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,483,151 B2 | 1/2009 | Zganec et al. | |
| 7,507,948 B2 | 3/2009 | Park et al. | |
| 7,539,557 B2 | 5/2009 | Yamauchi | |
| 7,571,511 B2 | 8/2009 | Jones et al. | |
| 7,636,982 B2 | 12/2009 | Jones et al. | |
| 7,656,541 B2 | 2/2010 | Waslowski et al. | |
| 7,761,954 B2 | 7/2010 | Ziegler et al. | |
| 7,801,676 B2 | 9/2010 | Kurosawa et al. | |
| 8,438,695 B2 * | 5/2013 | Gilbert, Jr. | A47L 11/302 15/319 |
| 8,594,019 B2 | 11/2013 | Misumi | |
| 8,739,355 B2 | 6/2014 | Morse et al. | |
| 8,855,914 B1 | 10/2014 | Alexander et al. | |
| 8,892,251 B1 | 11/2014 | Dooley et al. | |
| 8,921,752 B2 | 12/2014 | Iizuka | |
| 8,982,217 B1 | 3/2015 | Hickman | |
| 9,002,511 B1 | 4/2015 | Hickerson et al. | |
| 9,026,302 B2 | 5/2015 | Stout et al. | |
| 9,037,294 B2 | 5/2015 | Chung et al. | |
| 9,043,017 B2 | 5/2015 | Jung et al. | |
| 9,149,170 B2 | 10/2015 | Ozick et al. | |
| 9,220,386 B2 | 12/2015 | Gilbert, Jr. et al. | |
| 9,486,924 B2 | 11/2016 | Dubrovsky et al. | |
| 9,717,387 B1 | 8/2017 | Szatmary et al. | |
| 10,228,697 B2 | 3/2019 | Yoshino | |
| 2002/0016649 A1 | 2/2002 | Jones | |
| 2002/0103575 A1 | 8/2002 | Sugawara | |
| 2002/0120364 A1 | 8/2002 | Colens | |
| 2003/0025472 A1 | 2/2003 | Jones et al. | |
| 2003/0030398 A1 | 2/2003 | Jacobs et al. | |
| 2003/0034441 A1 * | 2/2003 | Kang | H05K 1/141 250/221 |
| 2003/0120389 A1 | 6/2003 | Abramson et al. | |
| 2003/0142925 A1 * | 7/2003 | Melchior | G02B 6/4246 385/89 |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |
| 2005/0000543 A1 | 1/2005 | Taylor et al. | |
| 2005/0010331 A1 | 1/2005 | Taylor et al. | |
| 2005/0041839 A1 | 2/2005 | Saitou et al. | |
| 2005/0067994 A1 | 3/2005 | Jones et al. | |
| 2005/0156562 A1 | 7/2005 | Cohen et al. | |
| 2005/0171636 A1 | 8/2005 | Tani | |
| 2005/0171644 A1 | 8/2005 | Tani | |
| 2005/0204717 A1 | 9/2005 | Colens | |
| 2005/0212680 A1 | 9/2005 | Uehigashi | |
| 2005/0256610 A1 | 11/2005 | Orita | |
| 2006/0012493 A1 | 1/2006 | Karlsson et al. | |
| 2006/0020369 A1 | 1/2006 | Taylor | |
| 2006/0095158 A1 | 5/2006 | Lee | |
| 2006/0237634 A1 | 10/2006 | Kim | |
| 2007/0027579 A1 | 2/2007 | Suzuki et al. | |
| 2007/0061041 A1 | 3/2007 | Zweig | |
| 2007/0234492 A1 | 10/2007 | Svendsen et al. | |
| 2007/0266508 A1 | 11/2007 | Jones et al. | |
| 2007/0282484 A1 | 12/2007 | Chung et al. | |
| 2008/0046125 A1 | 2/2008 | Myeong et al. | |
| 2008/0140255 A1 | 6/2008 | Ziegler et al. | |
| 2008/0155768 A1 | 7/2008 | Ziegler et al. | |
| 2008/0192256 A1 | 8/2008 | Wolf et al. | |
| 2008/0307590 A1 | 12/2008 | Jones et al. | |
| 2009/0048727 A1 | 2/2009 | Hong et al. | |
| 2009/0051921 A1 | 2/2009 | Masahiko | |
| 2009/0177320 A1 | 7/2009 | Lee et al. | |
| 2009/0182464 A1 | 7/2009 | Myeong et al. | |
| 2009/0281661 A1 | 11/2009 | Dooley et al. | |
| 2010/0030380 A1 | 2/2010 | Shah et al. | |
| 2010/0049365 A1 | 2/2010 | Jones et al. | |
| 2010/0082193 A1 | 4/2010 | Chiappetta | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2010/0324731 A1 | 12/2010 | Letsky | |
| 2010/0324736 A1 | 12/2010 | Yoo et al. | |
| 2011/0054689 A1 | 3/2011 | Nielsen et al. | |
| 2011/0137461 A1 | 6/2011 | Kong et al. | |
| 2011/0194755 A1 | 8/2011 | Jeong et al. | |
| 2011/0211731 A1 | 9/2011 | Lee et al. | |
| 2011/0224824 A1 | 9/2011 | Lee et al. | |
| 2011/0236026 A1 | 9/2011 | Yoo et al. | |
| 2011/0238214 A1 | 9/2011 | Yoo et al. | |
| 2011/0264305 A1 | 10/2011 | Choe et al. | |
| 2011/0278082 A1 | 11/2011 | Chung et al. | |
| 2011/0295420 A1 | 12/2011 | Wagner | |
| 2012/0008128 A1 * | 1/2012 | Bamji | G01S 17/894 356/5.01 |
| 2012/0013907 A1 | 1/2012 | Jung et al. | |
| 2012/0022785 A1 | 1/2012 | DiBernardo et al. | |
| 2012/0060320 A1 | 3/2012 | Lee et al. | |
| 2012/0069457 A1 | 3/2012 | Wolf et al. | |
| 2012/0169497 A1 | 7/2012 | Schnittman et al. | |
| 2012/0173070 A1 | 7/2012 | Schnittman | |
| 2012/0215380 A1 | 8/2012 | Fouillade et al. | |
| 2012/0223216 A1 | 9/2012 | Flaherty et al. | |
| 2012/0265370 A1 | 10/2012 | Kim et al. | |
| 2012/0271502 A1 | 10/2012 | Lee | |
| 2012/0283905 A1 | 11/2012 | Nakano et al. | |
| 2013/0001398 A1 * | 1/2013 | Wada | G01S 17/48 250/206.1 |
| 2013/0024025 A1 | 1/2013 | Hsu | |
| 2013/0166134 A1 | 6/2013 | Shitamoto | |
| 2013/0206177 A1 | 8/2013 | Burlutskiy | |
| 2013/0217421 A1 | 8/2013 | Kim | |
| 2013/0221908 A1 | 8/2013 | Tang | |
| 2013/0261867 A1 | 10/2013 | Burnett et al. | |
| 2013/0265562 A1 | 10/2013 | Tang et al. | |
| 2013/0317944 A1 | 11/2013 | Huang et al. | |
| 2014/0005933 A1 | 1/2014 | Fong et al. | |
| 2014/0098218 A1 | 4/2014 | Wu et al. | |
| 2014/0100693 A1 | 4/2014 | Fong et al. | |
| 2014/0115797 A1 | 5/2014 | Duenne | |
| 2014/0124004 A1 | 5/2014 | Rosenstein et al. | |
| 2014/0128093 A1 | 5/2014 | Das et al. | |
| 2014/0156125 A1 | 6/2014 | Song et al. | |
| 2014/0207280 A1 | 7/2014 | Duffley et al. | |
| 2014/0207281 A1 | 7/2014 | Angle et al. | |
| 2014/0207282 A1 | 7/2014 | Angle et al. | |

(56) References Cited

U.S. PATENT DOCUMENTS

| | | | |
|---|---|---|---|
| 2014/0218517 A1 | 8/2014 | Kim et al. | |
| 2014/0257563 A1 | 9/2014 | Park et al. | |
| 2014/0257564 A1 | 9/2014 | Sun et al. | |
| 2014/0257565 A1 | 9/2014 | Sun et al. | |
| 2014/0303775 A1 | 10/2014 | Oh et al. | |
| 2014/0316636 A1 | 10/2014 | Hong et al. | |
| 2014/0324270 A1 | 10/2014 | Chan et al. | |
| 2014/0343783 A1 | 11/2014 | Lee | |
| 2015/0115138 A1* | 4/2015 | Heng | G01S 17/04 250/216 |
| 2015/0115876 A1 | 4/2015 | Noh et al. | |
| 2015/0120056 A1 | 4/2015 | Noh et al. | |
| 2015/0151646 A1 | 6/2015 | Noiri | |
| 2015/0168954 A1 | 6/2015 | Hickerson et al. | |
| 2015/0173578 A1 | 6/2015 | Kim et al. | |
| 2015/0202772 A1 | 7/2015 | Kim | |
| 2015/0212520 A1 | 7/2015 | Artes et al. | |
| 2015/0223659 A1 | 8/2015 | Han et al. | |
| 2015/0260829 A1 | 9/2015 | Wada | |
| 2015/0265125 A1 | 9/2015 | Lee et al. | |
| 2015/0314453 A1 | 11/2015 | Witelson et al. | |
| 2015/0367513 A1 | 12/2015 | Gettings et al. | |
| 2016/0008982 A1 | 1/2016 | Artes et al. | |
| 2016/0037983 A1 | 2/2016 | Hillen et al. | |
| 2016/0041029 A1* | 2/2016 | T'Ng | G01S 17/04 250/239 |
| 2016/0066759 A1 | 3/2016 | Langhammer et al. | |
| 2016/0103451 A1 | 4/2016 | Vicenti | |
| 2016/0132056 A1 | 5/2016 | Yoshino | |
| 2016/0150933 A1 | 6/2016 | Duenne et al. | |
| 2016/0165795 A1 | 6/2016 | Balutis et al. | |
| 2016/0166126 A1 | 6/2016 | Morin et al. | |
| 2016/0200161 A1* | 7/2016 | Van Den Bossche | G01S 17/93 701/28 |
| 2016/0209217 A1 | 7/2016 | Babu et al. | |
| 2016/0213218 A1 | 7/2016 | Ham et al. | |
| 2016/0229060 A1 | 8/2016 | Kim et al. | |
| 2016/0271795 A1 | 9/2016 | Vicenti | |
| 2016/0282873 A1 | 9/2016 | Masaki et al. | |
| 2016/0297072 A1 | 10/2016 | Williams et al. | |
| 2016/0298970 A1 | 10/2016 | Lindhe et al. | |
| 2017/0001311 A1 | 1/2017 | Bushman et al. | |
| 2017/0083022 A1 | 3/2017 | Tang | |
| 2017/0147000 A1 | 5/2017 | Hoennige et al. | |
| 2017/0177001 A1 | 6/2017 | Cao et al. | |
| 2017/0197314 A1 | 7/2017 | Stout et al. | |
| 2017/0231452 A1 | 8/2017 | Saito et al. | |
| 2017/0364087 A1 | 12/2017 | Tang et al. | |

FOREIGN PATENT DOCUMENTS

| | | | |
|---|---|---|---|
| CN | 1381340 | 11/2002 | |
| CN | 1696612 | 11/2005 | |
| CN | 1699612 | 11/2005 | |
| CN | 101945325 | 1/2011 | |
| CN | 101972129 | 2/2011 | |
| CN | 102407522 | 4/2012 | |
| CN | 102738862 | 10/2012 | |
| CN | 203672362 | 6/2014 | |
| CN | 104460663 | 3/2015 | |
| CN | 104634601 | 5/2015 | |
| CN | 105990876 | 7/2015 | |
| CN | 105045098 | 11/2015 | |
| CN | 105334847 | 2/2016 | |
| CN | 105467398 | 4/2016 | |
| CN | 105527619 | 4/2016 | |
| DE | 4421805 | 8/1995 | |
| DE | 10204223 | 8/2003 | |
| DE | 10261787 | 1/2004 | |
| DE | 102007016802 | 3/2004 | |
| DE | 69913150 | 8/2004 | |
| DE | 102009059217 | 5/2008 | |
| DE | 102008028931 | 6/2008 | |
| DE | 102008014912 | 9/2009 | |
| DE | 102009041362 | 2/2011 | |
| DE | 102009052629 | 3/2011 | |
| DE | 102010000174 | 5/2011 | |
| DE | 102010000317 | 8/2011 | |
| DE | 102010000607 | 9/2011 | |
| DE | 102010017211 | 12/2011 | |
| DE | 102010017689 | 1/2012 | |
| DE | 102010033768 | 2/2012 | |
| DE | 102011050357 | 2/2012 | |
| DE | 102012201870 | 8/2012 | |
| DE | 102011006062 | 9/2012 | |
| DE | 102011051729 | 1/2013 | |
| DE | 102012211071 | 11/2013 | |
| DE | 102012105608 | 1/2014 | |
| DE | 102012109004 | 3/2014 | |
| DE | 202014100346 | 3/2014 | |
| DE | 102012112035 | 6/2014 | |
| DE | 102012112036 | 6/2014 | |
| DE | 102013100192 | 7/2014 | |
| DE | 102014110265 | 7/2014 | |
| DE | 102014113040 | 9/2014 | |
| DE | 102013104399 | 10/2014 | |
| DE | 102013104547 | 11/2014 | |
| DE | 102015006014 | 5/2015 | |
| DE | 102014012811 | 10/2015 | |
| DE | 102015119501 | 11/2015 | |
| DE | 102014110104 | 1/2016 | |
| DE | 102016102644 | 2/2016 | |
| DE | 60002209 | 10/2016 | |
| DE | 102016114594 | 2/2018 | |
| DE | 102016125319 | 6/2018 | |
| EP | 0142594 | 5/1985 | |
| EP | 0402764 | 12/1990 | |
| EP | 0769923 | 5/1997 | |
| EP | 1062524 | 12/2000 | |
| EP | 1342984 | 9/2003 | |
| EP | 1533629 | 5/2005 | |
| EP | 1553536 | 7/2005 | |
| EP | 1557730 | 7/2005 | |
| EP | 1621948 | 2/2006 | |
| EP | 1942313 | 7/2008 | |
| EP | 1947477 | 7/2008 | |
| EP | 1983396 | 10/2008 | |
| EP | 2027806 | 2/2009 | |
| EP | 2053417 | 4/2009 | |
| EP | 2078996 | 7/2009 | |
| EP | 2287697 | 2/2011 | |
| EP | 2053417 B1 * | 4/2011 | ........... G01S 7/4813 |
| EP | 2327957 | 6/2011 | |
| EP | 2327957 A1 * | 6/2011 | ............ G01S 17/48 |
| EP | 1941411 | 9/2011 | |
| EP | 2407847 | 1/2012 | |
| EP | 2450762 | 5/2012 | |
| EP | 2457486 | 5/2012 | |
| EP | 2498158 | 9/2012 | |
| EP | 2502539 | 9/2012 | |
| EP | 2511782 | 10/2012 | |
| EP | 2515196 | 10/2012 | |
| EP | 2573639 | 3/2013 | |
| EP | 2595024 | 5/2013 | |
| EP | 2740013 | 6/2014 | |
| EP | 2741159 | 6/2014 | |
| EP | 2853976 | 4/2015 | |
| EP | 2870852 | 5/2015 | |
| EP | 3079030 | 11/2015 | |
| EP | 3156873 | 4/2017 | |
| EP | 3184013 | 6/2017 | |
| GB | 2509989 | 7/2014 | |
| GB | 2509990 | 7/2014 | |
| GB | 2509991 | 7/2014 | |
| GB | 2513912 | 11/2014 | |
| JP | H04338433 | 11/1992 | |
| JP | 2001125641 | 5/2001 | |
| JP | 2002085305 | 3/2002 | |
| JP | 2003330543 | 11/2003 | |
| JP | 2004133882 | 4/2004 | |
| JP | 2005205028 | 8/2005 | |
| JP | 2009238055 | 10/2009 | |
| JP | 2010227894 | 10/2010 | |

(56) References Cited

FOREIGN PATENT DOCUMENTS

| | | |
|---|---|---|
| JP | 2013077088 | 4/2013 |
| JP | 2013146302 | 8/2013 |
| JP | 2014176260 | 9/2014 |
| JP | 201541203 | 3/2015 |
| KR | 100735565 | 5/2006 |
| KR | 100815545 | 3/2008 |
| KR | 20110092158 | 8/2011 |
| KR | 20140073854 | 6/2014 |
| KR | 20140145648 | 12/2014 |
| KR | 20150009413 | 1/2015 |
| KR | 20150050161 | 5/2015 |
| KR | 20150086075 | 7/2015 |
| KR | 20150124011 | 11/2015 |
| KR | 20150124013 | 11/2015 |
| KR | 20150124014 | 11/2015 |
| KR | 20150127937 | 11/2015 |
| KR | 101640706 | 7/2016 |
| KR | 20160097051 | 8/2016 |
| WO | 9523346 | 8/1995 |
| WO | 9928800 | 6/1999 |
| WO | 200004430 | 1/2000 |
| WO | 2005074362 | 8/2005 |
| WO | 2007028667 | 3/2007 |
| WO | 2012099694 | 7/2012 |
| WO | 2012157951 | 11/2012 |
| WO | 2013116887 | 8/2013 |
| WO | 2014017256 | 1/2014 |
| WO | 2014043732 | 3/2014 |
| WO | 2014055966 | 4/2014 |
| WO | 2014113091 | 7/2014 |
| WO | 2014138472 | 9/2014 |
| WO | 2015018437 | 2/2015 |
| WO | 2015025599 | 2/2015 |
| WO | 2015072897 | 5/2015 |
| WO | 2015082017 | 6/2015 |
| WO | 2015090398 | 6/2015 |
| WO | 2015158240 | 10/2015 |
| WO | 2015181995 | 12/2015 |
| WO | 2016019996 | 2/2016 |
| WO | 2016027957 | 2/2016 |
| WO | 2016028021 | 2/2016 |
| WO | 2016031702 | 3/2016 |
| WO | 2016048077 | 3/2016 |
| WO | 2016050215 | 4/2016 |
| WO | 2016091312 | 6/2016 |
| WO | 2016095966 | 6/2016 |

OTHER PUBLICATIONS

Oh et al., "Autonomous Battery Recharging for Indoor Mobile Robots," Massachusetts Institute of Technology Press, Aug. 30, 2000, document of 6 pages, XP055321836.

Siegwart, "Introduction to Autonomous Mobile Robots", Massachusetts, ISBN 978-0-26-219502-7, (2004), pp. 104-115, 151-163, 250-251, document of 37 pages. http://www.robotee.com/EBooks/Introduction_to_Autonomous_Mobile_Robots.pdf, XP055054850.

Lymberopoulos et al., "A Realistic Evaluation and Comparison of Indoor Location Technologies: Experiences and Lessons Learned," IPSN '15, Apr. 14-16, 2015, Seattle, WA, USA, document of 12 pages, http://dx.doi.org/10.1145/2737095.27.

Patent Cooperation Treaty, "International Search Report and Written Opinion" and translation of International Search Report, issued in International Application No. PCT/AT2016/050179, by European Searching Authority, document of 19 pages, dated Dec. 8, 2016.

Konolige et al., "A Low-Cost Laser Distance Sensor," 2008 IEEE International Conference on Robotics and Automation, Pasadena, CA, USA, May 19-23, 2008, document of 7 pages.

Everett, "Sensors for mobile robots: theory and application," A. K. Peters, Ltd. Natick, MA, USA, 1995 ISBN-10:1568810482, document of 543 pages.

Forlizzi, How robotic products become social products: An ethnographic study of cleaning in the home, 2007, IEEE, p. 129-136 (Year: 2007).

Kim et al., "User-Centered Approach to Path Planning of Cleaning Robots: Analyzing User's Cleaning Behavior." Proceedings of the 2007 ACM/IEEE Conference on Human-Robot Interaction, Mar. 8-11, 2007, pp. 373-380.

Neto et al., Human-Machine Interface Based on Electro-Biological Signals for Mobile Vehicles, 2006, IEEE, p. 2954-2959 (Year: 2006).

Sick Sensor Intelligence, "LMS200/211/221/291 Laser Measurement Systems", Jan. 2007, pp. 1-48, XP055581229, http://sicktoolbox.sourceforge.net/docs/sick-lms-technical-description.pdf.

Mahyuddin et al., "Neuro-fuzzy algorithm implemented in Altera's FPGA for mobile robot's obstacle avoidance mission", TENCON 2009—2009 IEEE Region 10 Conference, IEEE, Piscataway, NJ, USA, Jan. 23, 2009 document of 6 pages.

Vasquez-Gomez et al., "View planning for 3D object reconstruction with a mobile manipulator robot," 2014 IEEE/RSJ International Conference on Intelligent Robots and Systems, Sep. 14, 2014 IEEE, pp. 4227-4233.

* cited by examiner

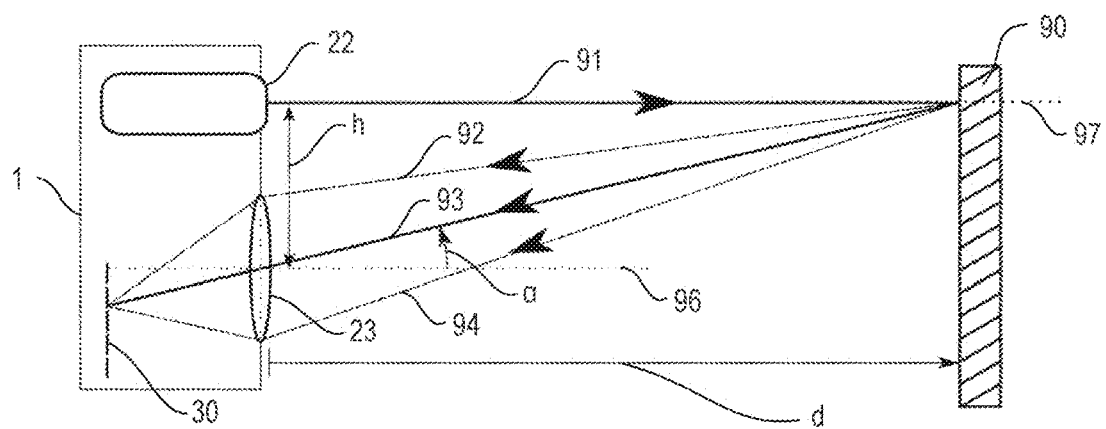
FIG 1
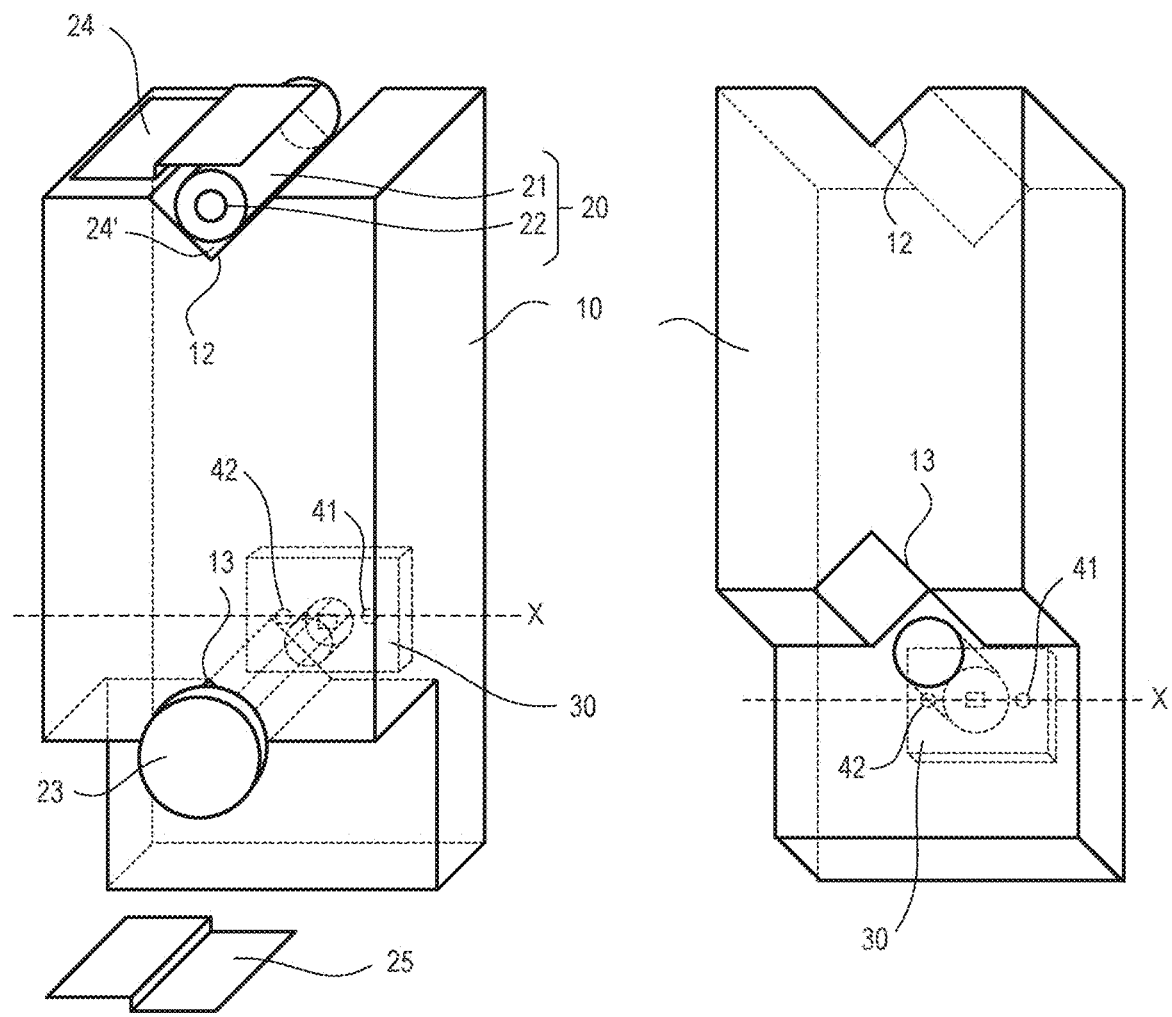
FIG 2A                    FIG 2B

OPTICAL TRIANGULATION SENSOR FOR DISTANCE MEASUREMENT

CROSS REFERENCE TO RELATED APPLICATIONS

This application is a § 371 National Phase of PCT/AT2016/050179, filed Jun. 6, 2016, which claims priority to German patent application DE 10 2015 109 775.3, filed Jun. 18, 2015, the disclosure of both of which is incorporated herein by reference.

TECHNICAL FIELD

The application relates to an optical triangulation sensor for contactless measurement of distances.

BACKGROUND

In the recent years, robots are increasingly being used in the household sector, for example for cleaning or for monitoring a home or other premises. Autonomous robots have, inter alia, sensors that allow them to detect obstacles (e.g. walls, furniture, persons etc.) and to thus survey their surroundings. This enables the robot to appropriately react to obstacles. The obstacles can be identified, for example, by a sensor system (crash sensors) that react when the robot collides with an obstacle. When the robot detects such an obstacle it can turn around or select a different path to its destination. Such a course of action is not sufficient in the case of more demanding tasks. If the robot, for example, is to plan a path from one room of a home into another room of that home, then it must be capable of detecting objects located at a greater distance. The robot can, for example, detect objects optically without contacting them. When detecting objects by means of optical triangulation, the achievable accuracy depends highly on the geometrical arrangement of the individual sensor components in relation to each other. Even a small displacement of a transmitter unit (e.g. the light source) or of a reception unit (e.g. the camera) can lead to measurement errors. This applies both to the manufacture, as well as to the operation of the sensors. When in operation, for example, temperature variations and the resulting thermal expansion can lead to the displacement of individual sensor components and thereby to a falsification of the measurement results. From the prior art, solutions are known that are aimed at preventing the measurement results from being falsified in this manner. This is generally carried out by arranging the sensor components in relation to each other as precisely as possible. Achieving such a precise arrangement can only be done by means of very small tolerances during manufacturing and at a corresponding cost. Measurement errors, nevertheless, can result from variations in temperature.

The disclosure provides an apparatus for distant optical measurement having high repeat accuracy and which is easy to manufacture.

The present disclosure provides an optical triangulation sensor a and a mobile robot having the features and structures recited herein. Various embodiments and further developments of the present disclosure are further recited herein.

SUMMARY

An optical triangulation sensor for distance measurement is described below. In accordance with one embodiment of the present disclosure, the apparatus comprises a light source for the generation of structured light, an optical reception device, at least one attachment element and a carrier with a first groove on a lateral surface of the carrier, wherein the light source and/or optical reception device is at least partially arranged in the first groove and is held in place on the carrier by the attachment element.

In accordance with a further embodiment, the apparatus comprises a light source for the generation of structured light having a first optical axis, an optical reception device having a second optical axis, as well as a carrier through which a light channel runs. A light sensitive sensor is arranged on a rear side of the carrier such that light incident through the light channel at least partially falls on the sensor, wherein the sensor is connected with the carrier only on two or more supporting surfaces along a line of attachment.

In accordance with a further embodiment, an optical triangulation sensor for the measurement of distances comprises a light source for the generation of structured light, an optical reception device, and a sensor circuit board with two or more light sensitive sensor chips arranged next to each other.

A further embodiment relates to an optical triangulation sensor with a light source for the generation of structured light, an optical reception device, a sensor circuit board and one or more light sensitive sensor chips. A screen is arranged to shield off diffused light emitted by the light source.

Further, a mobile robot is described. In accordance with one embodiment, the robot comprises an optical triangulation sensor installed in a closed installation chamber. The installation chamber has at least one window, through which light emitted by the triangulation sensor can exit the chamber and reflected light can enter it, wherein the inside of the at least one window is provided with an anti-reflective coating.

BRIEF DESCRIPTION OF THE DRAWINGS

FIG. 1 shows the physical principle of distance measurement by means of an electro-optical triangulation sensor.

FIG. 2 shows an exploded view of an embodiment of an apparatus in accordance with the present disclosure.

In the figures, like reference numerals designate the same or similar components, each having the same or similar meaning.

DETAILED DESCRIPTION

Figure 3A:
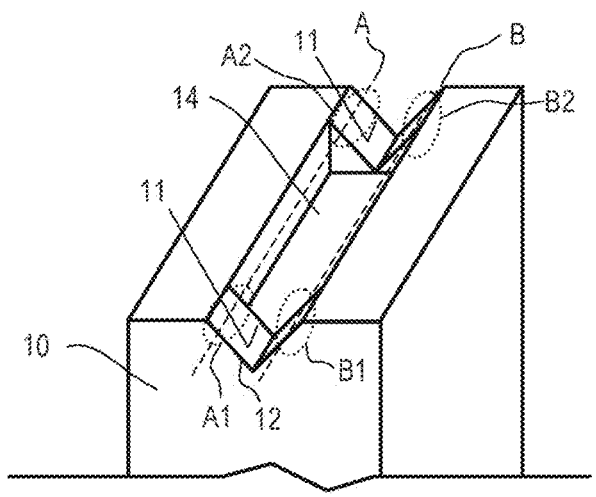
FIG. 3 shows an embodiment of a groove in a carrier for the mounting of a radiation source.

In FIG. 1 the principle of optical triangulation is illustrated. Using a light source 20 for structured light (e.g. a light diode or a laser diode having, if necessary, an optical device), a suitable optical reception device 23 (i.e. a light collector such as a lens or lens system) and a sensor 30 (e.g. an active pixel sensor, also known as a CMOS sensor), a distance d to an object 90 can be determined. The light source 20 emits a (structured, e.g. fanned to a line) light beam 91, which is reflected by (i.e. diffused back by) an object 90 (obstacle) at least partially in the direction of the optical reception device 23. The reflected beams 92, 93, 94 (only a selection) are directed to sensor by the optical reception device 23. With the aid of the sensor 30, in particular the incident angle α can be determined. Using the incident angle α and a predefined distance h between the light source 20 and the optical reception device 23, the distance d can be calculated. The predefined distance h is determined by the sensor assembly and may lie, for example, in a range of 1 cm to 10 cm, for example in a range of 2 cm to 7 cam. In the present example, h is the standard distance (normal distance) of the optical axes from the light source 20 and the optical reception device 23.

FIGS. 2A and 2B show the same example of an optical triangulation sensor in a perspective view from various angles. The triangulation sensor comprises a (e.g. approximately prism shaped) carrier 10, a light source 20 and an optical reception device 23 which may be consolidated in a camera module together with a CMOS sensor 30. The carrier 10 has, on a first lateral surface, a first recess, designated as a first groove 12. Further, the carrier 10 may be made of a material with a low coefficient of thermal expansion such as plastic, ceramic or metal. The carrier 10, for example, may be manufactured by plastic injection molding. The carrier 10, may also be made of a material with a high modulus of elasticity. The light source 20 is arranged in the first groove 12. The light source 20 for structured light may have an (adapter) housing 21, a radiation source 22 (e.g. a laser diode or a light-emitting diode), and may also comprise a collimator lens and/or a line generator. The housing 21 prevents the radiation source 22 from being damaged by external influences. The light source 20 may exhibit, (at least in certain parts) a round cross section and may be held in place on the carrier 10 with the aid of an attachment element 24. The light source 20 may, alternatively, also exhibit any other cross section form, for example an oval, rectangular, polygonal or rhombus shaped cross section. As a rule, then, the light source 20 is of a cylindrical or prism form. The cross section of the light source 20 need not be the same along its entire length (i.e. along its optical axis). The housing 21 of the light source 20 may have, e.g. at one end, a protrusion on which, e.g. a collimator lens is arranged. Various exemplary embodiments of the attachment element 24 will be described further on. As an alternative or in addition to the attachment element 24, an adhesive may also be used to hold the light source 20 in place on the carrier 10 (see FIG. 2A, adhesive layer 24'). In some embodiments the attachment element 24 will only be needed temporarily, until the adhesive has hardened, and it may be removed afterwards.

The light source 20 for structured light can emit focused, punctiform (point-shaped) or line-shaped (or any otherwise structured) light 91. When the apparatus is in operation, the light source 20 can emit light 91 continuously. As an alternative, the light source 20 may also only emit light 91 in intervals or when specifically activated. The light 91 may exhibit a wavelength between, e.g. 400 nm and 1000 nm. Larger and smaller wavelengths are also possible.

In a further example embodiment, the carrier 10 may have a second recess designated as a groove 13. In this, the optical reception device 23 or the entire camera module (which includes the optical reception device 23) can be arranged and may also be held in place in or on the groove 13 with the aid of an attachment element 25. In the illustrated example, the groove 13 is arranged symmetrically to the groove 12. The grooves 12 and 13 are arranged on opposite lateral surfaces of the carrier 10. A different arrangement, e.g. on one same lateral surface, is also possible.

The optical reception device 23 can be, for example, an optic lens. This optical reception device 23 collects and focuses the reflected radiated light (beams 92, 93, 94). The optical reception device 23 may be made of, for example, glass or plastic and may also comprise numerous individual lenses. The reflected beam 92, 93, 94 is conveyed to the sensor 30 by the optical reception device 23. Additionally or as an alternative, the optical reception device 23 may also have other optical components such as, for example, one or more mirrors.

The sensor 30 can be designed to be able to detect at least part of the reflected beam 92, 93, 94. Generally a CMOS sensor (active pixel sensor) or a CCD sensor (charge coupled device) is used. As an alternative, various kinds of photodiodes (e.g. a position sensitive device, PSD, and a quadrant photodiode, QPD) may be considered for sensor 30.

In the example described above, the optical reception device 23 and the sensor 30 are consolidated in a camera module. In a further example embodiment, the optical reception device 23 and the sensor 30 are attached separately from each other. Such a case is also illustrated in FIGS. 2A and 2B. Here the optical reception device 23 is arranged in the second groove 13, whereas the groove 13 does not extend over the entire depth of the carrier 10. In order that the optical reception device 23 be able to convey the reflected beam further to the sensor 30, the sensor is arranged behind the optical reception device 23. As shown in FIGS. 2A and 2B, the optical reception device 23 and the sensor 30 may be attached behind each other on two opposite main surfaces of the carrier 10 (front and rear side) and may be aligned with each other, whereas the groove 13 is arranged on a step-like ledge of the carrier 10 and therefore does not extend along the entire diameter of the carrier 10. The ledge is formed by recessing the lower area of front side of the carrier 10. The groove 12 thus runs in a lateral surface from the front side of the carrier 10 to the recessed front side, whereas an opening, designated as the light channel, adjoins the groove 13 through the recessed front side, the light being able to pass through the opening and up to the rear side of the carrier (on which the sensor 30 is arranged). The mounting of the sensor 30 (i.e. of a sensor circuit board on which a light sensitive chip is arranged) will be described in detail later with reference to FIGS. 8 and 9.

Figure 3B:
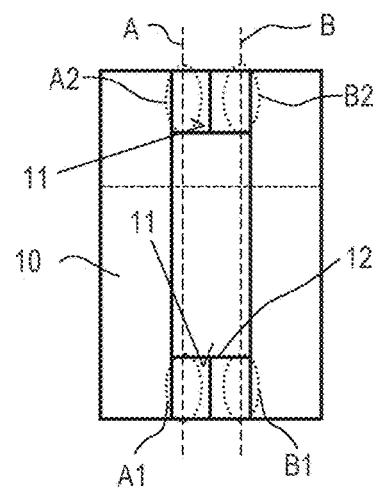

In FIG. 3 a possible design of the groove 12, arranged in the upper lateral surface (top surface) of the carrier 10, is shown. FIG. 3A shows a perspective view, FIG. 3B shows a top view. By means of the specific form of the groove 12, mounting areas 11 between the light source 20 and the carrier 10 are defined that allow for a linearly shaped contact between the light source 20 and the carrier 10. The cross section of the groove 12 may be designed, for example, triangular, rectangular, trapezoidal or rhombus shaped. Other forms are also possible. In general, the cross section of the groove 12 and the light source 20 (i.e. their housing) are formed such that the light source 20 inserted in the groove 12 only rests along two lines A and B (contact lines) on the mounting areas 11 that are formed by the lateral walls of the groove 12. In the example embodiment shown here, the contact lines A, B run parallel to the longitudinal axis (optical axis) of the light source 20. As can also be inferred from FIGS. 3A and 3B, the cross section of the groove 12 is not uniform throughout the entire groove. The cross section of groove 12 is, for example, only at the two ends of the groove 12 approximately triangular, between these, however, (in the longitudinal direction of the groove) it is rectangular. This means that the groove 12 may be enlarged in its middle region by the recess 14, thereby interrupting the mounting areas 11, such that the light source 20 now only rests on two segments each (A1, A2 and B1, B2) of the contact lines A and B. The remaining mounting areas 11 along the contact lines may be relatively short (approximately 1 mm), thus forming a total of four approximately "punctiform" mounting areas at which the light source 20 contacts the carrier 10. By virtue of such a design of carrier 10, thermally induced tension is not so easily transferred to the light source 20. The position of the transmission unit is only minimally altered by the thermal expansion of the carrier, and in a defined, reversible manner. Measurement accuracy improves. The statements made with reference to groove 12 equally apply to groove 13 and the optical reception device 23 attached therein.

In FIGS. 4 through 7 various attachment elements 24 are exemplarily shown. As can be seen from the FIGS. 4 to 7, the attachment element 24 can be implemented as one, two or numerous parts. The attachment elements 24 are designed to press the light source 20 against the carrier 10, thereby providing its friction-locked attachment to the carrier 10. The information given with reference to the attachment elements 24 equally apply to the attachment of the transmission unit 20 in the groove 12, as well as to the attachment of the optical reception device 23 in the groove 13. The force effect of the attachment elements 24 on the light source 20 and the optical reception device 23 can be directed in the direction of their respective linear mounting areas 11. The attachment elements 24 are elastic and can therefore yield to a thermal expansion of the light source 20. In addition to this, they can apply a pre-defined force to the light source 20 (e.g. in a direction normal to the longitudinal axis of the light source 20), thereby preventing the radiation unit 20 from becoming displaced in the event of impacts or vibration. At the same time, the force can be defined so as not to impair the functionality of the light source 20. Further, an adhesive may additionally be applied to the points of connection between light source 20 and carrier 10 and/or between light source 20 and attachment element 24. Generally the carrier exhibits a higher degree of stiffness than a stiffness of the attachment elements. Generally this means that, in the event of thermal expansion, first and foremost the attachment element will yield, providing for a well-defined (predictable) behavior of the carrier.

Figure 4:
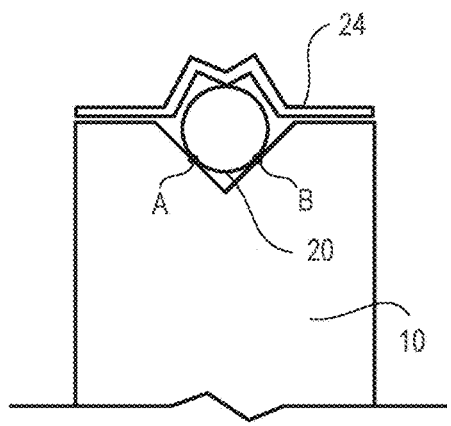
FIGS. 4-7 show various examples of attachment elements for attaching a radiation source onto the carrier in accordance with FIG. 3.

FIG. 4 shows a one-piece attachment element 24 that is screwed onto the carrier 10 by means of screw attachments. The attachment element 24 can be screwed onto the lateral surface of the carrier 10 on which the groove 12 is also disposed. As can be inferred from FIG. 4, the attachment element 24 can be made of a pre-contoured metal sheet or a suitably formed (e.g. by means of injection molding) plastic part that is pre-tensioned when the attachment element 24 is screwed onto the carrier 10, thus holding the transmission unit 20 in place in the groove 12.

Figure 5:
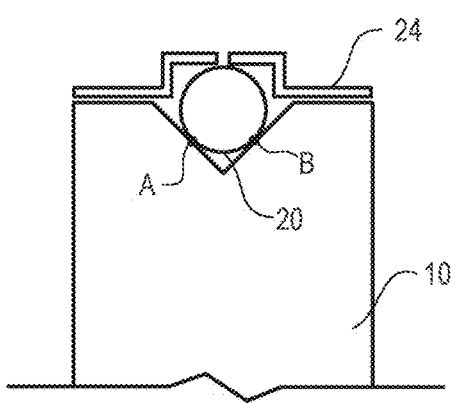

In the further embodiment of FIG. 5, the attachment element 24 is comprised of two parts. The two parts of the attachment element 24 are made of two pre-contoured metal sheets or suitably formed plastic parts, mounted at a certain distance from each other (on opposite sides of the groove 12) on the carrier 10. The two attachment elements 24 need not necessarily mechanically contact each other.

Figure 6:
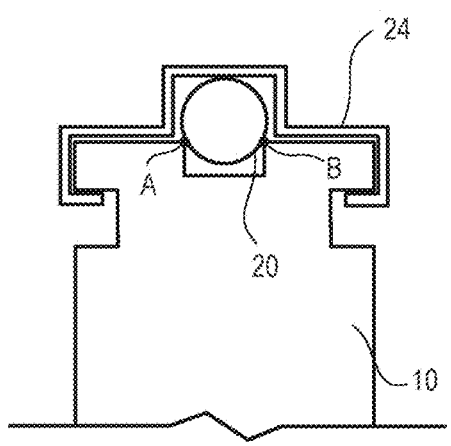

FIG. 6 shows a further exemplary embodiment. Here the attachment element 24 is implemented as one part and is at least partially conjoined with the carrier 10. The attachment element 24 forms a kind of clamp that can be locked in place on the carrier (snap-in connection). As already mentioned in reference to the preceding figures, the attachment element 24 in FIG. 6 can be appropriately contoured or formed in advance, so that it is pre-tensioned when the light source 20 is mounted, exerting a force on the transmission unit 20 and pressing it against the carrier 10.

Figure 7:
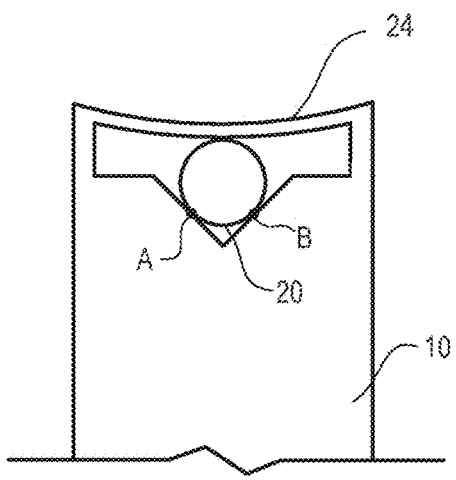

FIG. 7 shows an attachment element 24 that is cohesively bonded to the carrier 10. The cohesive bond can be realized, for example, by gluing, welding or soldering. Alternatively, the carrier 10 can be manufactured in one piece together with the attachment element 24 (e.g. by injection molding). The attachment element can be pre-tensioned so that, when the transmission unit 20 is mounted, a force is exerted on the transmission unit 20 and it is pressed against the carrier 10.

Figure 8:
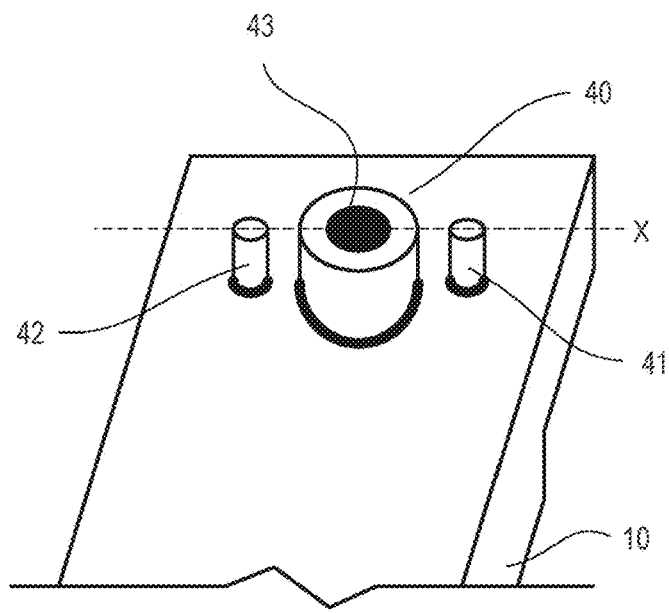
FIG. 8 shows a shielding structure on a carrier.

FIG. 8 shows a further embodiment. As mentioned above, the sensor 30 can form a component (camera module) together with the optical reception device 23. As an alternative, however, it is also possible for the sensor 30 to be attached to the carrier 10 independently of the optical reception device 23. The sensor 30 (sensor chip including sensor circuit board) is also attached to the carrier on defined mounting areas 41, 42 along a line designated as attachment line X (e.g. by means of screws). The attachment line X, with the "attachment points" that are defined by the mounting areas, extends, for example but not necessarily, symmetrically to a light channel 43 that runs through the carrier 10 and through which light from the optical reception device (not shown in FIG. 8) can reach the sensor 30.

The mounting areas 41, 42 may, for example, protrude from the surface of the carrier 10 (e.g. in the form of pins, sleeves, etc.), allowing the sensor 30 to be mounted parallel to the surface of the carrier. In this case the sensor only rests on the at least two mounting areas 41, 42 that are arranged along the attachment line X, wherein the attachment line X runs normal to the plane formed by the optical axes of light source 20 and optical reception device 23. Consequently, the sensor 30 and the carrier 10 can thermally expand independently of each other without causing significant mechanical tension in the sensor 30 and the resulting expansion, at least not in a direction that is relevant for the distance measurement. This means a thermal expansion of the sensor 30 relative to the carrier 10, in a direction at a right angle to attachment line X and normal to the optical axis of the optical reception device, is not impaired.

Due to the elevated attachment of the sensor 30, a gap is formed between the light sensitive sensor 30 and the surface of the carrier 10, through which undesired diffused light might have a negative effect on the sensor measurement. In order to counteract this, a shielding structure 40 may be arranged on a lateral side of the carrier 10 facing the sensor 30 which at least partially surrounds the light channel 43 and also protrudes from the surface of the carrier. This shielding structure 40 may be realized in a ring form, for example. It is, however, also possible for the shielding structure 40 to be realized in a rectangular form. The shielding structure 40 may be as high as or lower than (relative to the surface of the carrier) the mounting areas 41, 42.

The mounting areas 41, 42 may be at a pre-defined standard distance from the underlying lateral surfaces of the carrier 10. The distance of the sensor 30 to the carrier 10 and the focal length of the optical reception device 23 are matched to each other. The position of attachment line X (i.e. its distance to the optical axis of the light source 20) may be selected such that reflected beams 92, 93, 94 of a distant (theoretically infinitely distant) object 90 strike the attachment line X. This range (great distances) demands the highest degree of measurement accuracy. At greater distances, the position at which the reflected beams 92, 39, 94 fall into the optical reception device converge to a threshold value. "Great distances" refers to distances at the far end of the distance measurement range, e.g. in the range of 5 to 10 m. By selecting the attachment line in the manner described above, the effect of a thermal expansion of the sensor 30 relative to the carrier 10 is minimized in this range. The attachment line X may therefore lie at a height at which beams reflected from far distant objects strike the sensor. When the optical axis 96 of the optical reception device 23 runs approximately parallel to the optical axis 97 of the light source 20, the attachment line X lies at the height of the optical axis 96 of the optical reception device 23.

Figure 9:
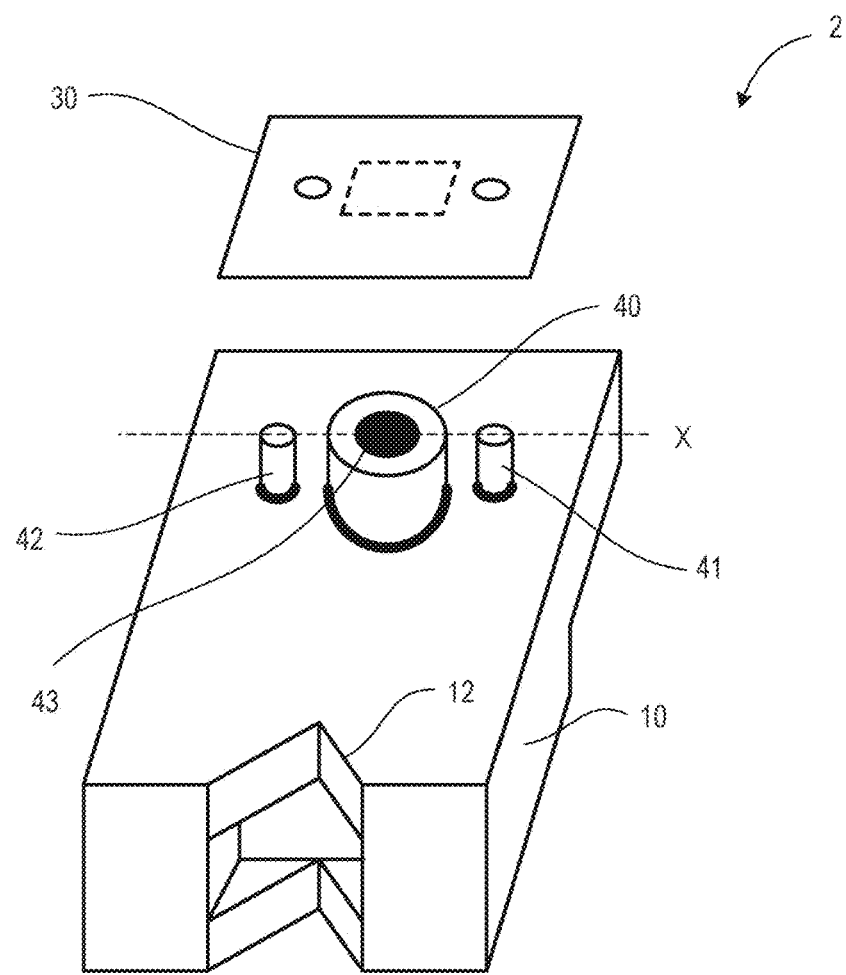
FIG. 9 shows an embodiment of a carrier for the attachment of an optical reception device.

FIG. 9 shows an exploded view of the carrier of FIG. 8, together with mounting surfaces 41, 42, the shielding structure 40 and the sensor 30 that is attached to the attachment elements 41, 42 along a line X. In one embodiment, the sensor 30 is arranged on a circuit board. An analysis unit or other electronic components may also be mounted on this circuit board. This may lead to a circuit board of a size that can no longer be attached along the attachment line X with sufficient mechanical stability. In order to nevertheless continue avoiding mechanical tension that might impair measurement accuracy, the circuit board is realized as two or more parts that are connected with each other such that no significant forces can be transmitted from one part to another. For example, the connection between the two parts might be flexible or elastic. The elastic (flexible) connections between the circuit boards could be designed to contain electrical connections. Smaller relative displacements between the individual circuit boards can thus take place without producing great mechanical tension. Connecting two separate circuit boards with cables in an elaborate production step may thus be avoided.

Figure 10:
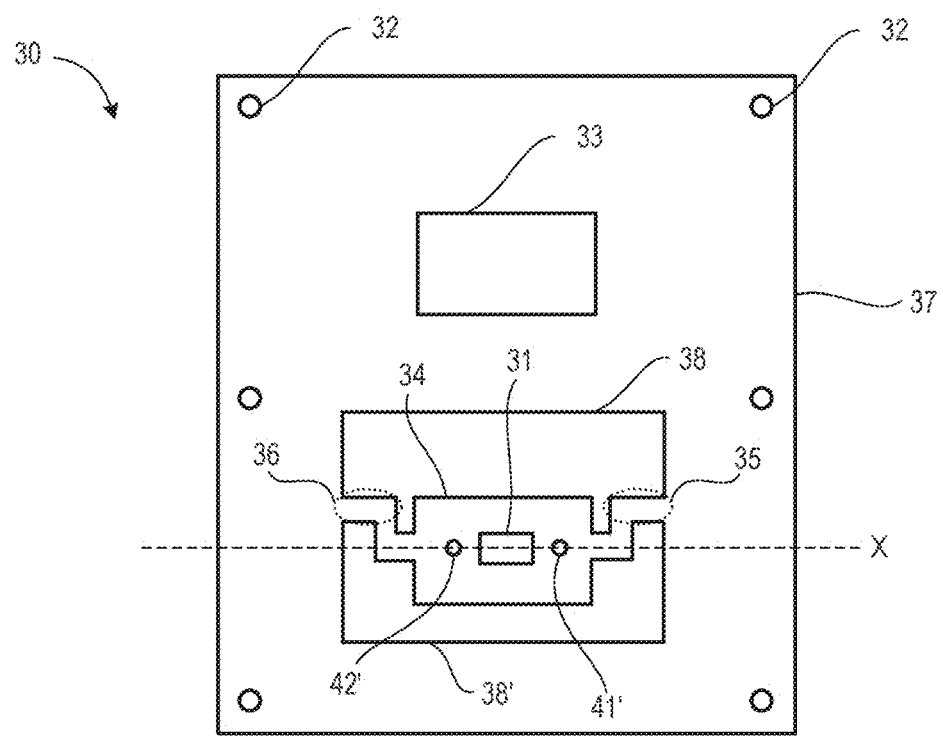
FIG. 10 shows an embodiment of a camera circuit board with a light sensitive sensor.

FIG. 10 shows an example of a sensor 30 with a circuit board 37 in which two cutouts 38 and 38' are formed, the cutouts 38, 38' being formed such that a sensor circuit board 34 for the light sensitive sensor chip 31 remains in between, the sensor chip being connected with the surrounding circuit board only via one or more thin flexible bridges. The cutout can be produced, for example, by milling, punching or cutting. In the present example, the sensor circuit board 34 is connected with the surrounding circuit board 37 via the two bridges 35 and 36. In FIG. 10 the attachment line X is also once again shown (cf. FIGS. 2 and 8), along which the sensor circuit board 34 is connected, at the positions 41' and 42', with the mounting areas 41 and 42 (see FIG. 9). The circuit board 37 surrounding the sensor circuit board 34 may contain additional electronic components 33 and may be attached to the carrier 10 at numerous positions 32. The thin, flexible bridges 35 and 36 bring about a mechanical decoupling (no or only very little transmission of force in a direction perpendicular to the attachment line) of the sensor circuit board 34 from the surrounding circuit board 37.

In further embodiments the sensor 30 may have numerous sensor chips 31 arranged next to each other (along the attachment line X). In this case, the individual sensor chips 31 may be designed smaller than the entire image area of the optical reception device 23. In particular, the sensor chips 31 may be arranged in pre-defined (e.g. lying horizontally next to each other) segments of the image area of the optical reception device 23. It is thus possible to ensure that, even in case of large (lying in a horizontal plane) beam radiation angles of the light source 20, for example 120°, the reflected beams 92, 93, 94 will be received by using small, commonly sold sensor chips that are much less expensive than a larger one would be.

After manufacturing a device for distance measurement, its calibration may be necessary. This calibration can be carried out, for example, at the average working temperatures of an installation. Alternatively it may be carried out for different working temperatures. The (possibly temperature dependent) calibration data may be optionally stored in a memory unit of the sensor 30.

Figure 11:
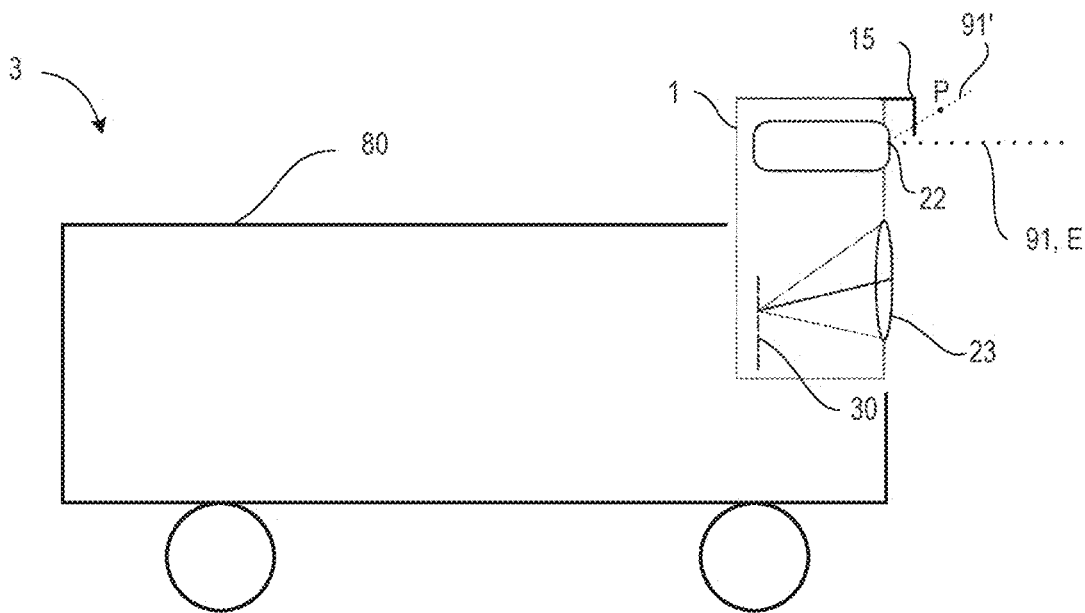
FIG. 11 shows an embodiment of a work machine.

FIG. 11 shows a work machine 80 (e.g. a cleaning robot) with an optical triangulation sensor that may be constructed as described above in reference to the FIGS. 1 through 10. Here the triangulation sensor for distance measurement is attached to the work machine 80 in a suitable manner and can be employed by the work machine 80 to measure distances. For example, the distance measurement device may be arranged on the front side of the work machine 80, in the middle of the work machine 80 or at the rear on one side of the work machine 80. Further, the distance measurement device may be arranged such that it extends at least partially beyond the work machine 80, so that the distance measurement is not impaired by other components of the work machine 80. In a further embodiment of the work machine 80, the distance measurement device may be installed inside of the work machine 80 in an installation chamber. This protects the device for distance measurement from dust and other external influences. For example, the device may be located behind one or more windows. These windows are at least partially permeable for the emitted beam 91 and the reflected beams 92, 93, 94. The windows can function simultaneously as filters. Radiation having a wave length that differs from the wave length of the beam emitted by the light source 20 will be thus at least partially filtered out.

Besides this, reflections within the inside of the work machine 80 can be reduced by various means. For this purpose the installation chamber may be provided with a low-reflecting inner coating or may be painted dark or it may be formed of a material that has a low reflection coefficient. The windows of the installation chamber may be made of a material that reflects as little as possible of the light 91 emitted by the light source 20 and, for example, may be provided with an non-reflecting coating. The degree of reflection of parts of the installation chamber may be less than 10%, for example. Generally, a screen 15 may be arranged either on the carrier 10 or and the work machine 80 such that undesired diffused light emitted by the light source 20 (see the upward running light beam 91') is shielded off. The light source 20 emits light predominantly in a (i.e. horizontal) plane E. The screen 15 can in this case be designed and arranged to shield off diffused light that is deflected towards a point P lying above the plane E. In this manner, no undesired reflections caused by the diffused light falling on strongly reflecting objects can enter the optical reception device. The screen 15 may be, for example, a slit screen. Since, as a rule, diffused light that is deflected down does not cause problems, a "half slit screen", i.e. a shield with a horizontally running edge, is also sufficient, whereby a, e.g. horizontally emitted main beam 91 is not impaired while the diffused light deflected upwards is nevertheless shielded off. The screen 15 may be employed in any of the embodiments of the triangulation sensor described here.

We claim:
1. A sensor, comprising:
a light source for generating structured light which has a first optical axis;
an optical reception device with a second optical axis;
a carrier through which a light channel runs;
a light sensitive sensor is arranged on an outer surface of a rear side of the carrier such that light passing through the light channel at least partially falls onto the sensor;

wherein the light sensitive sensor is only connected with the carrier on two or more mounting surfaces along an attachment line X; and wherein the sensor is an optical triangulation sensor.

2. The sensor in accordance with claim 1, wherein the mounting surfaces protrude from the rear side of the carrier.

3. The sensor in accordance with claim 1, wherein the attachment line stands normal to a plane defined by the first and the second optical axes.

4. The sensor in accordance with claim 1, wherein the attachment line is positioned on the carrier such that light from the light source that is reflected from far distant objects falls approximately onto the attachment line.

5. The sensor in accordance with claim 1,
wherein the light sensitive sensor has a sensor circuit board on a light sensitive chip is arranged,
wherein the sensor circuit board is connected with a further electronic circuit board via flexible bridges,
wherein the sensor circuit board is only connected with the carrier on the mounting surfaces along the attachment line, and
wherein the further electronic circuit board is also connected with the carrier.

6. The optical triangulation sensor in accordance with claim 5, wherein the sensor circuit board, with the exception of the bridges, is separated from the further electronic circuit board by cutouts.

7. A sensor, comprising the following:
a light source for generating structured light;
an optical reception device;
an attachment element or an adhesive;
a carrier with a first groove on an outer surface of a lateral side of the carrier,
wherein the light source, the optical reception device, or a combination thereof, are at least partially arranged in the first groove and held in place on the outer surface of the lateral side of the carrier by the attachment element or the adhesive,
wherein the first groove, the light source, the optical reception device, or a combination thereof, are formed such that the light source, the optical reception device, or a combination thereof only contact the carrier along two parallel contact lines; and
wherein the sensor is an optical triangulation sensor.

8. The sensor in accordance with claim 7, wherein the carrier has, in a middle segment of the first groove a recess, so that the light source, the optical reception device only rest on two or more interrupted segments of the contact lines (A,B).

9. The sensor in accordance with claim 7, wherein the first groove has two lateral surfaces that form contact surfaces upon which the light source, the optical reception device, or a combination thereof, rest along the contact lines.

10. The sensor in accordance with claim 7,
wherein the light source is at least partially arranged in the first groove, and
wherein the carrier has a second groove in which the optical reception device is at least partially arranged.

11. The sensor in accordance with claim 10, wherein the second groove and the optical reception device are formed such that the optical reception device only rests on the carrier along two contact lines.

12. The optical triangulation sensor in accordance with claim 11, wherein the carrier has, in a middle segment of the second groove a recess so that the optical reception device only rests on two or more interrupted segments of the contact lines.

13. The sensor in accordance with claim 11, wherein the second groove has two lateral surfaces that form contact surfaces upon which the light source, the optical reception device, or a combination thereof, rest along the contact lines.

14. The sensor in accordance with claim 10, wherein one part of a front side of the carrier is recessed and the second groove runs in a lateral surface of the two lateral surfaces from the front side of the carrier to the recessed part of the front side of the carrier.

15. The sensor in accordance with claim 14,
wherein the second groove adjoins a light channel running from the recessed part of the front side of the carrier to a rear side of the carrier, and
wherein a light sensitive sensor is arranged on the rear side of the carrier.

16. The sensor in accordance with claim 7, wherein the carrier exhibits a higher degree of stiffness than a stiffness of the attachment element.

17. An apparatus having an optical distance-measuring sensor, the optical distance-measuring sensor comprising:
a light source for generating structured light which is sent to an obstacle;
a light sensitive sensor that detects light reflected by the obstacle;
a carrier to which the light source and the light sensitive sensor are attached;
wherein the optical distance-measuring sensor is installed in an optically enclosed installation chamber;
wherein the installation chamber has a window, through which light emitted from the light source can exit and light reflected by an obstacle can enter; and
wherein the apparatus is a mobile robot.

18. The apparatus in accordance with claim 17, wherein the optical distance-measuring sensor comprises an analysis unit in electronic communication with the light sensitive sensor.

19. The apparatus in accordance with claim 17,
wherein the light source is a monochromatic light source generating light of almost one wave length, and
wherein the window acts as an optical filter, which is arranged to filter out at least partially light having a wave length that differs from the wave length of the light emitted by the light source.

20. The apparatus in accordance with claim 17, wherein inside of the installation chamber is coated with a light absorbing coating having a reflection factor of less than 0.1.

21. The apparatus in accordance with claim 17, wherein a shield is attached to the carrier to shield diffused light of the light source, to prevent diffused light of the light source to reach the light sensitive sensor, or a combination thereof.

22. The apparatus in accordance with claim 17, wherein the at least one window is provided on the inside with an antireflection coating.

23. The sensor in accordance with claim 1, wherein the sensor is mounted on a robot.

24. The sensor in accordance with claim 1, wherein the carrier is approximately prism-shaped.

* * * * *